(12) United States Patent
Allen, Jr. et al.

(10) Patent No.: US 9,053,031 B2
(45) Date of Patent: *Jun. 9, 2015

(54) SYSTEM AND METHOD FOR HANDLING DATA ACCESS

(75) Inventors: James Johnson Allen, Jr., Raleigh, NC (US); Steven Kenneth Jenkins, Raleigh, NC (US); James A. Mossman, Raleigh, NC (US); Michael Raymond Trombley, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 889 days.

This patent is subject to a terminal disclaimer.

(21) Appl. No.: 11/953,201

(22) Filed: Dec. 10, 2007

(65) Prior Publication Data

US 2009/0150401 A1 Jun. 11, 2009

(51) Int. Cl.
*G06F 12/00* (2006.01)
*G06F 12/08* (2006.01)

(52) U.S. Cl.
CPC .................................. *G06F 12/0862* (2013.01)

(58) Field of Classification Search
None
See application file for complete search history.

(56) References Cited

U.S. PATENT DOCUMENTS

| | | | |
|---|---|---|---|
| 5,689,499 A * | 11/1997 | Hullett et al. | 370/235 |
| 6,233,645 B1 | 5/2001 | Chrysos et al. | |
| 6,625,707 B2 | 9/2003 | Bormann | 711/169 |
| 6,704,842 B1 | 3/2004 | Janakiraman et al. | 711/141 |
| 6,804,750 B2 | 10/2004 | LaBerge | 711/154 |
| 7,130,967 B2 | 10/2006 | Arimilli et al. | 711/137 |
| 7,584,294 B2 * | 9/2009 | Plamondon | 709/233 |
| 7,600,078 B1 * | 10/2009 | Cen et al. | 711/137 |
| 2002/0087811 A1 | 7/2002 | Khare et al. | 711/146 |
| 2002/0095301 A1 * | 7/2002 | Villena | 705/1 |
| 2003/0005252 A1 | 1/2003 | Wilson et al. | |
| 2003/0079089 A1 * | 4/2003 | Barrick et al. | 711/137 |
| 2004/0098552 A1 | 5/2004 | Kadi | |
| 2004/0148470 A1 * | 7/2004 | Schulz | 711/137 |
| 2004/0162947 A1 | 8/2004 | Hooker | 711/132 |
| 2005/0117583 A1 | 6/2005 | Uchida et al. | |
| 2005/0155026 A1 | 7/2005 | DeWitt et al. | |
| 2006/0174228 A1 * | 8/2006 | Radhakrishnan et al. | 717/127 |
| 2006/0179175 A1 * | 8/2006 | Bockhaus et al. | 710/22 |
| 2006/0294223 A1 * | 12/2006 | Glasgow et al. | 709/224 |
| 2007/0214335 A1 | 9/2007 | Bellows et al. | |
| 2007/0294487 A1 | 12/2007 | Mino et al. | |

OTHER PUBLICATIONS

Office Action for U.S. Appl. No. 11/953,255 dated Apr. 28, 2010.
Office Action from U.S. Appl. No. 11/953,255 dated Oct. 6, 2010.

* cited by examiner

*Primary Examiner* — Michael Krofcheck
(74) *Attorney, Agent, or Firm* — Winstead, P.C.

(57) ABSTRACT

A method for handling speculative access requests for a storage device in a computer system is provided. The method includes the steps of providing a speculative access threshold corresponding to a selected percentage of the total number of accesses to be speculatively issued, and intermixing demand accesses and speculative accesses in accordance with the speculative access threshold. In another embodiment, a method for reducing data access latency experienced by a user in a computer network is provided. The method includes the steps of providing a web page comprising a link to a data file stored on a database connected to the computer network, selecting a speculative access threshold corresponding to a selected percentage of data accesses which are to be speculatively provided to the user, and speculatively providing the data file in accordance with the speculative access threshold.

15 Claims, 14 Drawing Sheets

SYSTEM AND METHOD FOR HANDLING DATA ACCESS

FIELD OF THE INVENTION

The present invention relates in general to computer systems and, more particularly, to handling data requests in computer systems.

BACKGROUND

Computer systems issue speculative queries to reduce average access latency by attempting to guess whether an access to a specific data item will actually be necessary. If the guess is correct, the data will be available earlier, thereby reducing latency. An incorrect guess, however, may tie up valuable computer system resources and may increase latency if a demand access, e.g., a non-speculative access, must wait for an incorrect guess to be flushed from the system. The challenge of minimizing access latency grows more difficult as computer memory systems continue to become more complex. For example, conventional computer memory systems may include multiple levels of memory hierarchy, multiple cores on a singe die, and multiple dies linked together to form large multi-node or multi-blade systems. In view of these complex memory systems, providing a coherent memory space becomes more important in order to minimize the overhead of software-based operating systems, for example.

Accordingly, there is a need in the art for proper weighting between demand and speculative data fetches to minimize access latency and maximize performance of a computer system.

SUMMARY OF THE INVENTION

The problems outlined above may at least in part be solved in some embodiments by the system and method for handling data requests of the present invention.

In one embodiment, a method for handling speculative access requests for a computer system is provided. The method includes the steps of providing a speculative access threshold corresponding to a selected percentage of the total number of accesses, e.g., data queries and/or fetches, to be speculatively issued, and intermixing demand accesses and speculative accesses in accordance with the speculative access threshold.

In one embodiment, a computer system includes a CPU, a storage device such as RAM and magnetic or optical disk drives, circuitry for providing a speculative access threshold corresponding to a selected percentage of the total number of accesses to be speculatively issued, and circuitry for intermixing demand accesses and speculative accesses in accordance with the speculative access threshold.

In one embodiment, a computer program product embodied in a computer readable medium for handling speculative access requests for a storage device in a computer system is provided. The computer program product includes the programming steps of providing a speculative access threshold corresponding to a selected percentage of the total number of accesses to be speculatively issued, and intermixing demand accesses and speculative accesses in accordance with the speculative access threshold.

In one embodiment, a method for reducing data access latency experienced by a user in a computer network is provided. The method includes the steps of providing a web page comprising a link to a data file stored on a database connected to the computer network, selecting a speculative access threshold corresponding to a selected percentage of data accesses which are to be speculatively provided to the user, and speculatively providing the data file in accordance with the speculative access threshold.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein.

DETAILED DESCRIPTION

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
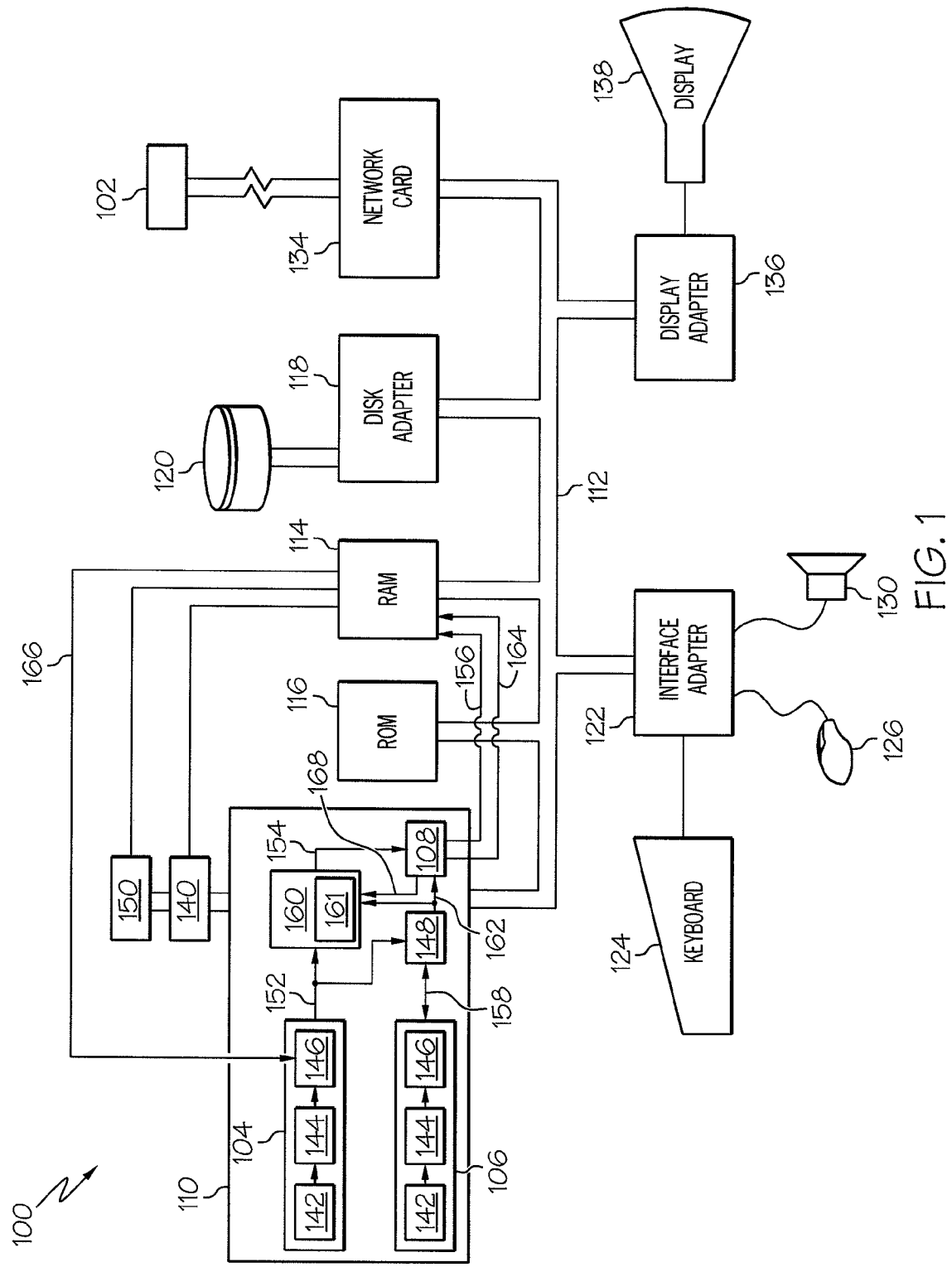
FIG. 1 is an embodiment of a computer system.
Figure 8:
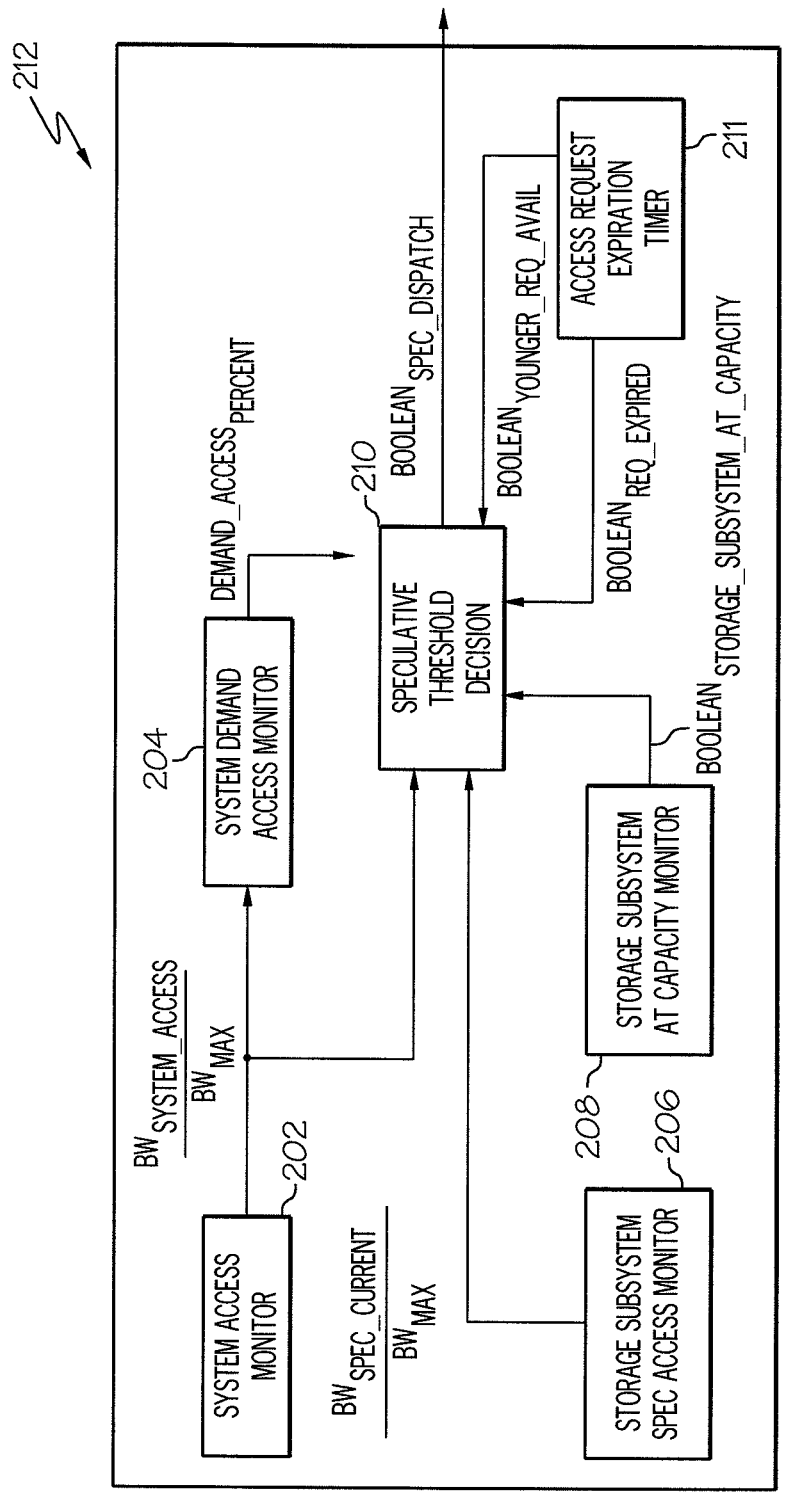
FIG. 8 is an embodiment of algorithm functions of the speculative access threshold algorithm.
Figure 9:
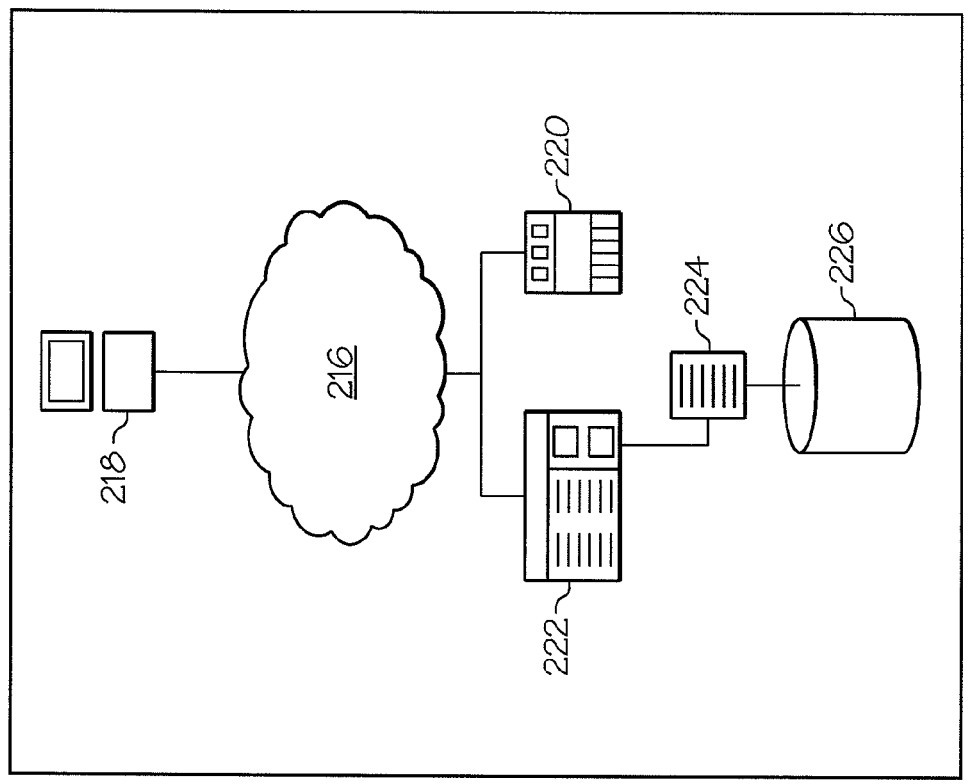
FIG. 9 is an embodiment of a computer network.

A system and method for dynamically adjusting the number of speculative access requests based upon the storage subsystem workload and rate of incoming requests to reduce access latency are provided. In one embodiment, a system and method uses a speculative access threshold algorithm to dynamically intermix demand and speculative access requests to improve latency. FIG. 1 and the associated description describe an embodiment of a computer system for practicing the disclosed system and method. FIGS. 2-7, Equations 1-46, and the related description describe the derivation of an embodiment of the speculative access threshold algorithm. FIG. 8, Equation 47, Table 1 and the associated description describe an embodiment of the speculative access threshold algorithm. FIG. 9 shows an embodiment of a computer network system for practicing the disclosed system and method.

FIG. 1—Computer System

FIG. 1 illustrates an embodiment of a hardware configuration of computer system 100 which is representative of a hardware environment for practicing embodiments of the disclosed system and method. Computer system 100 may have a multi-processor system 110 coupled to various other components by system bus 112. An operating system 140 may run on multi-processor system 110 and provide control and coordinate the functions of the various components of computer system 100. Software programs or applications 150 in accordance with embodiments of the disclosed system and method may run in conjunction with operating system 140 and provide calls to operating system 140 where the calls implement the various functions or services to be performed by application 150.

Referring to FIG. 1, Read-Only Memory (ROM) 116 may be coupled to system bus 112 and include a basic input/output system ("BIOS") that controls certain basic functions of computer system 100. Random access memory (RAM) 114 and disk adapter 118 may also be coupled to system bus 112. RAM 114 may comprise dynamic random access memory (DRAM), among other types of memory. It should be noted that software components including operating system 140 and application 150 may be loaded into RAM 114, which may be computer system's 100 main memory for execution. Disk adapter 118 may be an integrated drive electronics ("IDE") adapter that communicates with a disk unit 120, e.g., disk drive.

Referring to FIG. 1, multi-processor system 110 may comprise a first processor 104 and a second processor 106. First and second processors 104 and 106 may each comprise CPU core 142, L1 cache 144 and L2 cache 146. Computer system 100 may comprise memory controller 108 to manage the flow of data to and from the memory of computer system 100, e.g., ROM 116 and RAM 114. Computer system 100 comprises coherency protocol interrogation logic 148 to maintain coherency between first and second processors 104 and 106. Computer system 100 may comprise speculative access threshold algorithm logic 160 to dynamically intermix demand and speculative access requests in accordance with embodiments of the disclosed system and method. For example, software running on the first processor 104 may detect the possible need to access a particular data item which may be stored in RAM 114 or on disk 120. This information may be broadcast to logic 148 and 160 which will determine if the needed storage resource currently has capacity for additional access requests. Is so, the appropriate commands may be issued via 156 or 112 to retrieve the data item. For requests the go to RAM, the computer systems cache subsystem will also be searched and may return all or part of the requested data item instead of the RAM. Feedback may be provided via 168 to allow logic 160 to provide parameters for the speculative access threshold algorithm.

Referring to FIG. 1, computer system 100 may further include a communications adapter or network card 134 coupled to bus 112. Communications adapter 134 may interconnect bus 112 with network 102 enabling computer system 100 to communicate with other devices over network 102. I/O devices may also be connected to computer system 100 via a user interface adapter 122 and display adapter 136. Keyboard 124, mouse 126 and speaker 130 may all be interconnected to bus 112 through user interface adapter 122. Data may be inputted to computer system 100 through any of these devices. A display monitor 138 may be connected to system bus 112 by display adapter 136. In this manner, a user is capable of inputting to computer system 100 through keyboard 124 or mouse 126 and receiving output from computer system 100 via display 138 or speaker 130.

The various aspects, features, embodiments or implementations of the disclosed system and method described herein can be used alone or in various combinations. The disclosed methods can be implemented by software, hardware or a combination of hardware and software. The disclosed system and method can also be embodied as computer readable code on a computer readable medium. A computer readable storage medium may be, for example, but not limited to, read-only memory, random access memory, CD-ROMs, flash memory cards, DVDs, and magnetic tape. A computer readable signal medium may include a propagated data signal which may take any of a variety of forms, including, but not limited to, electro-magnetic, optical, or any suitable combination thereof.

Figure 2:
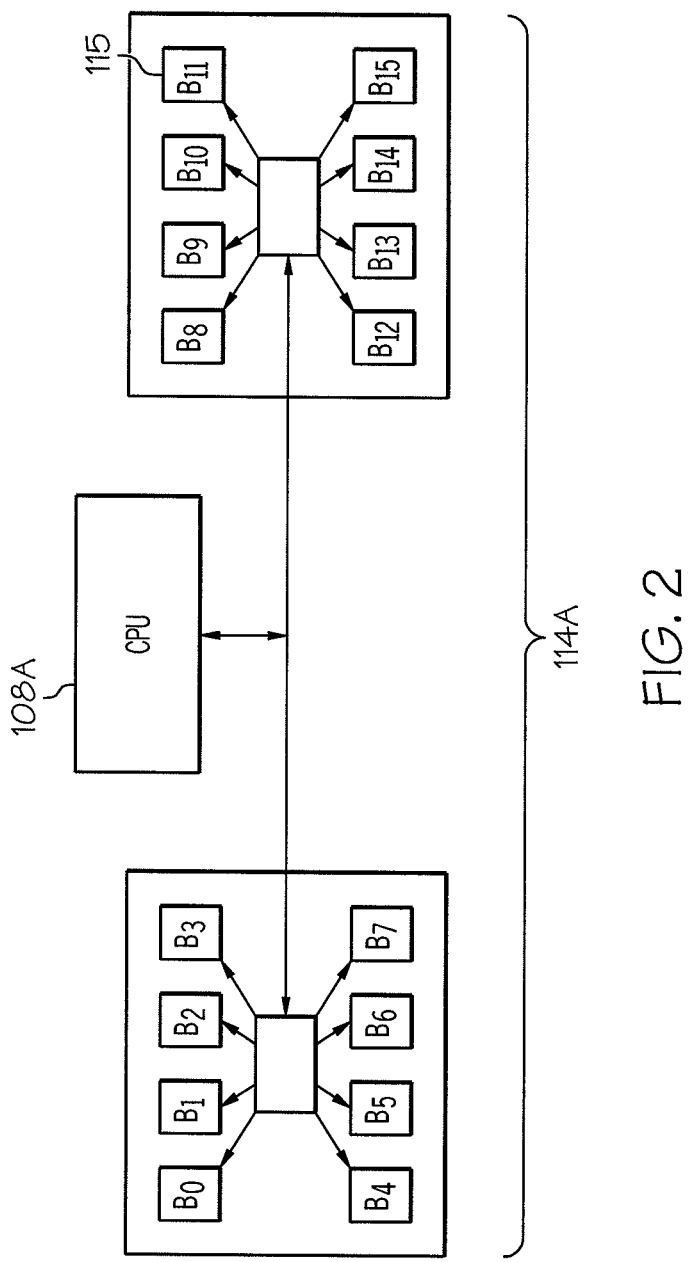
FIG. 2 is a sketch of a computer system consisting of a CPU attached to multiple information storage devices.

FIG. 2—CPU and Storage Subsystem

FIG. 2 illustrates an embodiment of a CPU connected to a multiplicity of information storage devices 114a These devices may contain their own hierarchy of storage elements such as banks of memory or disk platters. For the purposes of the following discussion concerning the calculation of access times (Taccess), storage devices 114a may be viewed as a collection of multiple independent resources, 115. The embodiment of storage devices 114a shown in FIG. 2 comprises sixteen devices 115, shown as B0-B15. The dynamic nature of the storage elements within each device 115 results in a device busy penalty whenever multiple reads to the same device 115 occur within the device busy window (Tdb). While the address space of system 108a is divided across all devices 115, the probability of multiple system access addresses mapping to the same device 115 should be taken into account. Because the number of read accesses greatly exceeds the number of write updates for the typical conventional system, the effect of write updates to the devices 115 accessibility may be ignored in the following analysis.

An access collision is the condition where multiple different data access requests require the use of the same physical device. This results in all but one of the requests having to wait for the device to become available. In the simple case where no access collisions occur, access times may be viewed as the sum of the minimum raw access time (Ta) and the read transfer time (Trd) as shown below in Equation 1:

$$T_{access} = T_a + T_{rd} = T_{access\_min} \qquad (1)$$

If access collisions are considered, then additional factors may be considered, including the pattern of address accesses; the total number of devices 115 in the storage subsystem 114A (Nb); the current bandwidth utilization (UTILpercentage) and the device busy window (Tdb). Typically, access collisions only occur when multiple accesses occur within the device busy window (Tdb). Because each read transfer (Trd) takes a finite length of time, the average penalty due to the device busy window (Tdb_delay_average) may be expressed as a probability. For example, a penalty is incurred only in cases where the current access, e.g., ACCESS0, also matches an access to the same device 115 within the past device busy window (Tdb). Accordingly, P(ACCESSn) may be defined as the probability that another access to the same device 115 as the current access occurred no earlier than n read transfer time slots ago, e.g., n is the number of time slots within the device busy window (Tdb) that should be considered when looking for an access collision. As a result, the average penalty due to the device busy window (Tdb_delay_average) may be expressed as shown below in Equation 2:

$$T_{db\_delay\_average} = T_{db} - (P(ACCESS_1) \times (1 \times T_{rd})) \\ - (P(ACCESS_2) \times (2 \times T_{rd})) \\ \ldots \\ - (P(ACCESS_n) \times (n \times T_{rd})) \quad (2)$$

where $n \leq T_{db}/T_{rd}$ = number of "time slots" within the device busy window that must be considered when looking for an access collision The average access time (Taccess_average) may be expressed as shown below in Equation 3:

$$T_{access\_average} = T_a + T_{rd} + T_{db\_delay\_average} \quad (3)$$

As discussed below, bandwidth utilization may affect the average access time (Taccess_average). Bandwidth may be described as the number of accesses processed in a given time period assuming that accesses occur in fixed size granules such as cache lines or disk sectors. Accordingly, bandwidth (BWdb_access) may be expressed in terms of the number of read accesses (ACCESSdb) that occur on average during every device busy window (Tdb) as shown below in Equation 4:

$$BW_{db\_access} = ACCESS_{db}/T_{db} \quad (4)$$

The maximum bandwidth (BWdb_max_access) may be expressed in terms of the maximum number of simultaneous device accesses (ACCESSdb_max) as shown below in Equations 5-7:

$$ACCESS_{db} \leq ACCESS_{db\_max} \quad (5)$$

$$ACCESS_{db\_max} = T_{db}/T_{rd} \quad (6)$$

$$BW_{db\_max\_access} = ACCESS_{db\_max}/T_{db} \quad (7)$$

Current bandwidth utilizaton (UTILpercentage) may be expressed as shown below in Equation 8:

$$UTIL_{percentage} = BW_{db\_access} / BW_{db\_max\_access} \quad (8)$$
$$= ACCESS_{db} / ACCESS_{db\_max}$$

Assuming that the pattern of accesses follows a uniform distribution, each access may be considered statistically independent from all other accesses. The probability that (i) a second access occurs one read transfer time period (Trd) before the current access; and (ii) both the first and second accesses map to the same device 115 may be expressed as shown below in Equation 9:

$$P(B_1) = (ACCESS_{db}/ACCESS_{d\_max}) \times (1/N_d) \quad (9)$$

Similarly, the probability that (i) another access occurs two transfer time periods (Trd) before the current access; and (ii) both accesses map to the same device 115 may be expressed as shown below in Equation 10:

$$P(B_2) = (ACCESS_{db}/ACCESS_{db\_max}) \times (1/(N_d-1)) \quad (10)$$

The device collision probability (Pdn), e.g., the probability that the current access maps to the same device 115 as an access that occurred n read transfer time periods (Trd) ago, may be generalized as shown below in Equation 11:

$$P(D_n) = \begin{cases} 0, & n < 1, n \geq ACCESS_{db\_max}, \\ \dfrac{UTIL_{percentage}}{N_d - n + 1}, & 1 \leq n, n < ACCESS_{db\_max}, n < N_d \\ UTIL_{percentage}, & N_d \leq n < ACCESS_{db\_max} \end{cases} \quad (11)$$

For the purposes of Equation 2, e.g., Tdb_delay_average, P(ACCESSn) should use non-overlapping probabilities. For example, the probability that (i) another access occurs two read transfer time periods (Trd) before the current access; (ii) both accesses map to the same device 115; and (iii) any access during the first read transfer time period (Trd) did not map to the same device 115, may be expressed as shown below in Equation 12:

$$P(ACCESS_2) = P(D_2) \times (1 - P(D_1)) \quad (12)$$

Accordingly, the probability P(ACCESSn) may be expressed as shown below in Equation 13:

$$P(ACCESS_n) = \begin{cases} P(D_n) \times \prod_{k=1}^{n-1} [1 - P(D_{n-k})], & 1 \leq n < ACCESS_{db\_max} \\ \prod_{k=1}^{n-1} [1 - P(D_{n-k})], & n = ACCESS_{db\_max} \end{cases} \quad (13)$$

FIG. 3—Access Time

Figure 3:
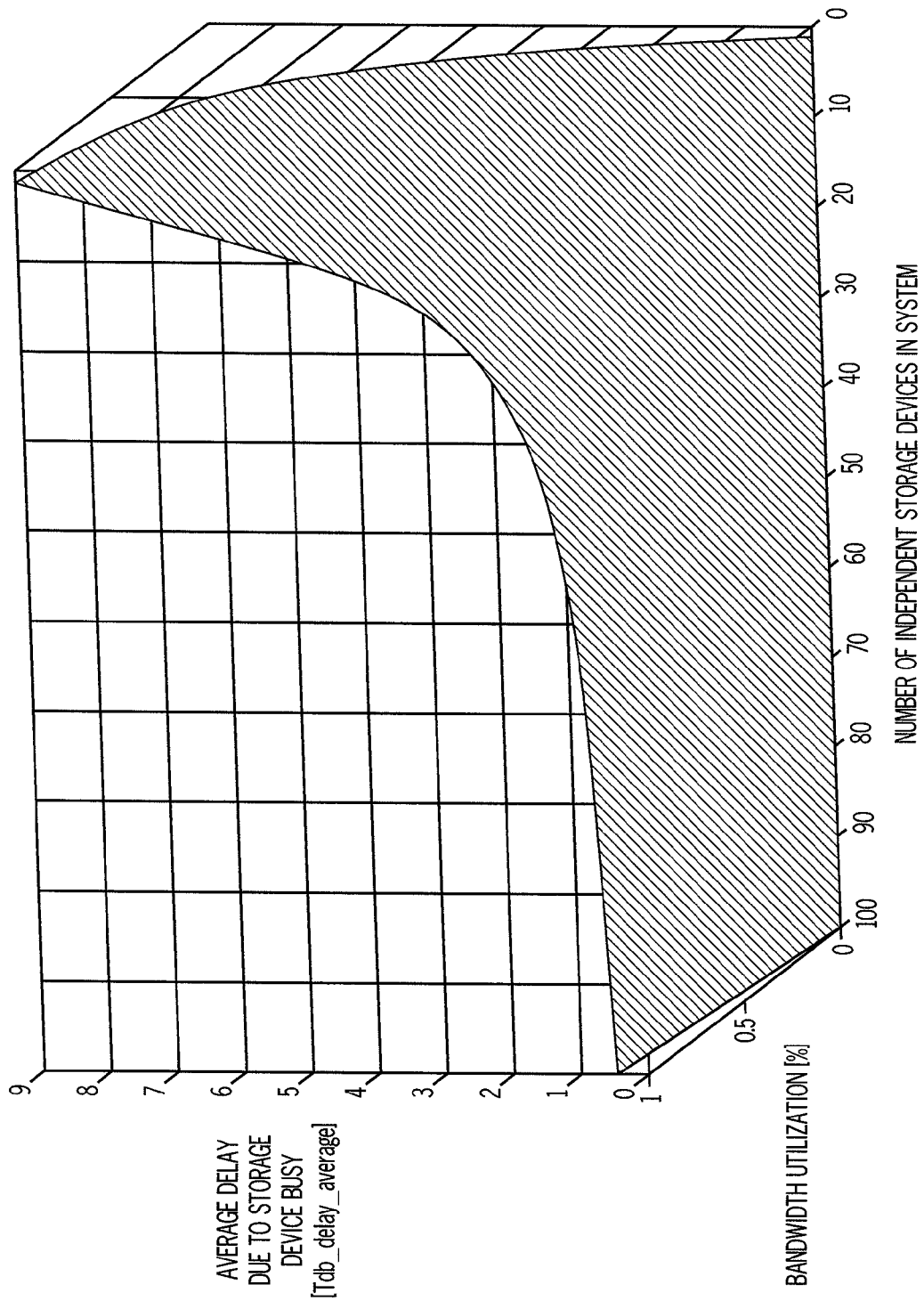
FIG. 3 is a graph showing the average access time for the computer system shown in FIG. 2.

With the definition of P(ACCESSn) as expressed in Equation 13, Taccess_average may be observed in terms of the average penalty due to the device busy window (Tdb_delay_average) and the maximum number of accesses that occur during a device busy window (ACCESSdb_max). For instance, in the example shown in FIG. 4, values of Tdb_delay_average are shown for ACCESSdb_max=10. As shown in FIG. 3, as bandwidth utilization (UTILpercentage) approaches zero, the average access time (Taccess_average) approaches the ideal minimum access time (Taccess_min). As the number of devices in a storage subsystem (Nd) increases, the average access time (Taccess_average) also approaches the ideal minimum access time (Taccess_min). Generally, as long as Nd>>ACCESSdb_max, Taccess_min may be considered a good approximation of the average access time.

Figure 4:
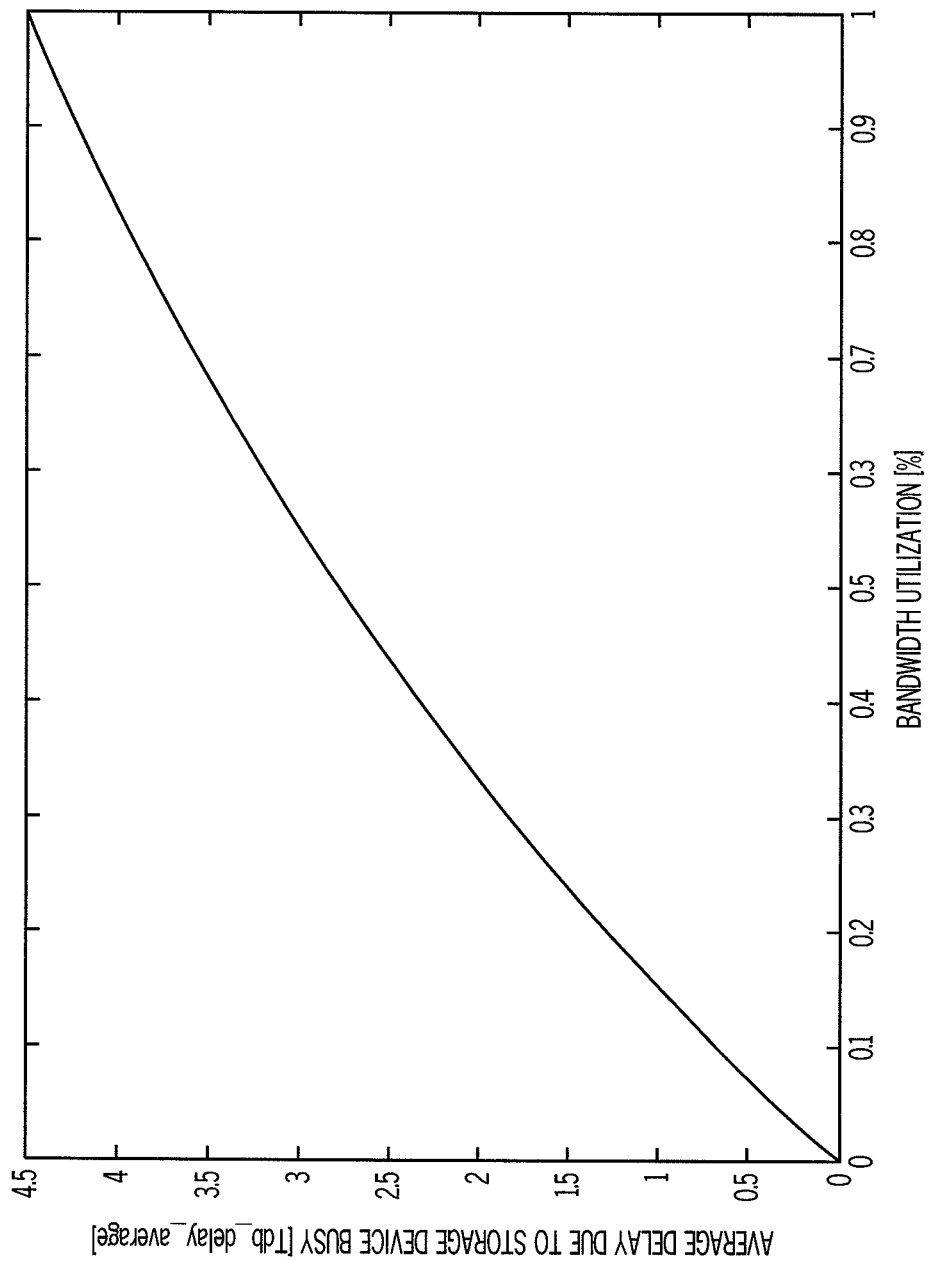
FIG. 4 is a graph showing the average delay caused by busy storage devices for the computer system shown in FIG. 2.

FIG. 4—Average Delay Caused by Device Collisions

Typically, for systems at 100% utilization, e.g., UTILpercentage=100%, that have the same number of devices (Nd) as time slots within the device busy window (ACCESSdb_max), an access may be expected to incur, on average, about 50% of the device busy window as an access delay. FIG. 4 shows an example of the average delay (Tdb_delay_average) caused by device busy collisions as bandwidth utilization (UTILpercentage) varies, where Nd=ACCESSdb_max=10. As shown in FIG. 4, however, the actual average delay is 4.5, and not 5, e.g., 50% of ACCESSdb_max. Because the maximum device busy delay that an access can experience is ACCESSdb_max−1, the average delay will be about 50% of the maximum, e.g., in the example shown in FIG. 4, the average delay is 4.5. This "ACCESSdb_max−1" factor may also be observed in FIG. 3, where the maximum average delay is shown as 9 when Nd=1, even though ACCESSdb_max=10.

For the case of a simple demand-driven access, the access latency (Tdemand_access) may be expressed as the sum of the latency incurred by locating the data item ($T_{address\_lookup}$), the latency incurred by checking to see if the data item has already been fetched ($T_{cache\_check}$), and the device latency (Taccess), as shown below in Equation 14:

$$T_{demand\_access} = T_{address\_lookup} + T_{cache\_check} + T_{access} \quad (14)$$

From the point of view of the speculative dispatch logic, Taddress_lookup appears to be a fixed value, contributing the same latency to each access. As discussed above, the contribution of Taccess to latency requires an analysis of several factors, including the probability of certain types of address conflicts, bandwidth utilization, and device constraints, for example. To the speculative dispatch logic, both Taddress_lookup and Taccess are values over which the speculative dispatch logic has little to no control. The speculative dispatch logic can choose to start accessing a device early, however, prior to receiving the results of the check for previously cached data, e.g., a speculative access. In the best case scenario, a speculative access may reduce the access latency by effectively eliminating Tcache_check, as shown below in Equation 15:

$$T_{spec\_access} = T_{address\_lookup} + T_{access} \quad (15)$$

In an idealized system with infinite storage subsystem bandwidth, all accesses could be dispatched speculatively to maximize performance. Unfortunately, in systems with large storage spaces, there are several practical considerations that place an upper limit on storage subsystem bandwidth (BWaccess_max), e.g., finite transistor counts, limitations within the storage devices (e.g., open pages, number of read heads, etc.), among other factors. The practical effect of limited bandwidth is that any access request received by the storage subsystem, either demand based or speculative, cannot be serviced if resources are unavailable.

A speculative access that results in a miss, e.g., the check for a cached copy of the requested data indicates that the access was actually not needed, results in wasted bandwidth within the storage subsystem. A speculative access that the check for cached copies later validates as being necessary is viewed as a "hit." Instead of choosing to dispatch an access speculatively, the speculative dispatch logic may wait for the results from the check for cached copies before issuing an access request, e.g., a demand access. The storage subsystem bandwidth (BWaccess_max) serves as the upper limit on the total bandwidth used by speculative hits and misses (BWspec_access_hit and BWspec_access_miss) plus the bandwidth used for demand accesses (BWdemand_access), as shown below in Equation 16:

$$BW_{access\_max} \geq BW_{spec\_access\_hit} + BW_{spec\_access\_miss} + BW_{demand\_access} \quad (16)$$

Bandwidth limitations may also be expressed in terms of the maximum number of accesses that may be in-progress simultaneously. For example, the upper limit of the storage subsystem bandwidth (BWaccess_max) may be expressed as the total number of accesses that the storage subsystem can process (ACCESSmax) in a finite amount of time (Tmax), as shown below in Equations 17-22, where ACCESScurrent is the current count of accesses, ACCESSspec_hit is the current number of speculative accesses that result in hits, ACCESSspec_miss is the number of speculative accesses that result in misses, and ACCESSdemand is the current number of demand accesses:

$$BW_{access\_max} = \frac{ACCESS_{max}}{T_{max}} \quad (17)$$

$$ACCESS_{current} = ACCESS_{spec\_hit} + ACCESS_{spec\_miss} + ACCESS_{demand} \quad (18)$$

$$ACCESS_{max} \geq ACCESS_{current} \quad (19)$$

$$BW_{spec\_access\_hit} = \frac{ACCESS_{spec\_hit}}{ACCESS_{max}} \times BW_{access\_max} \quad (21)$$

$$BW_{demand\_access} = \frac{ACCESS_{demand}}{ACCESS_{max}} \times BW_{access\_max} \quad (22)$$

Conventional computer systems typically implement an interconnect bus with a bandwidth (BWsystem_access_max) that exceed the storage subsystem's ability to access physical devices (BWaccess_max). This excess in the interconnect bus bandwidth provides the ability to implement a number of protocol techniques, including grouping multiple caches into a larger common cache space; and eliminating the need to access a storage subsystem device in those cases where a cache-miss from one cache can be satisfied by data within a different cache. The capabilities of modern bus protocols should be considered when implementing a storage subsystem based speculative access policy. Furthermore, because the rate of access requests presented to the systems' storage subsystem (BWsystem_access) changes dynamically under varying system loads, the speculative access policy should be capable of adapting to both changing access request patterns and available storage subsystem resources.

Figure 5:
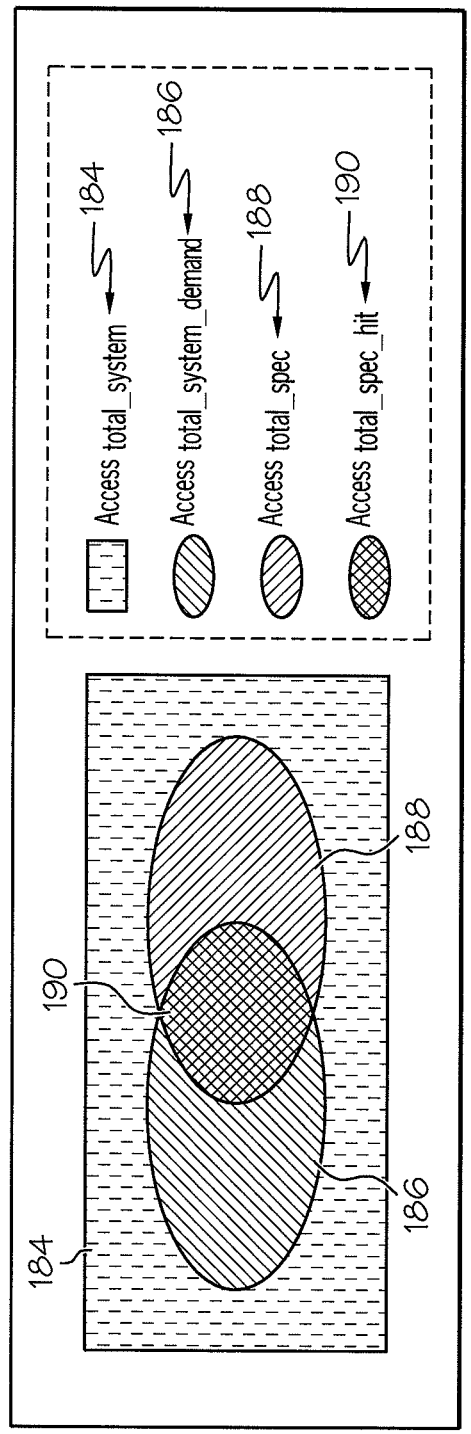
FIG. 5 is a Venn diagram showing the relationship between access types.

FIG. 5—Relationship between Access Types

Figure 6:
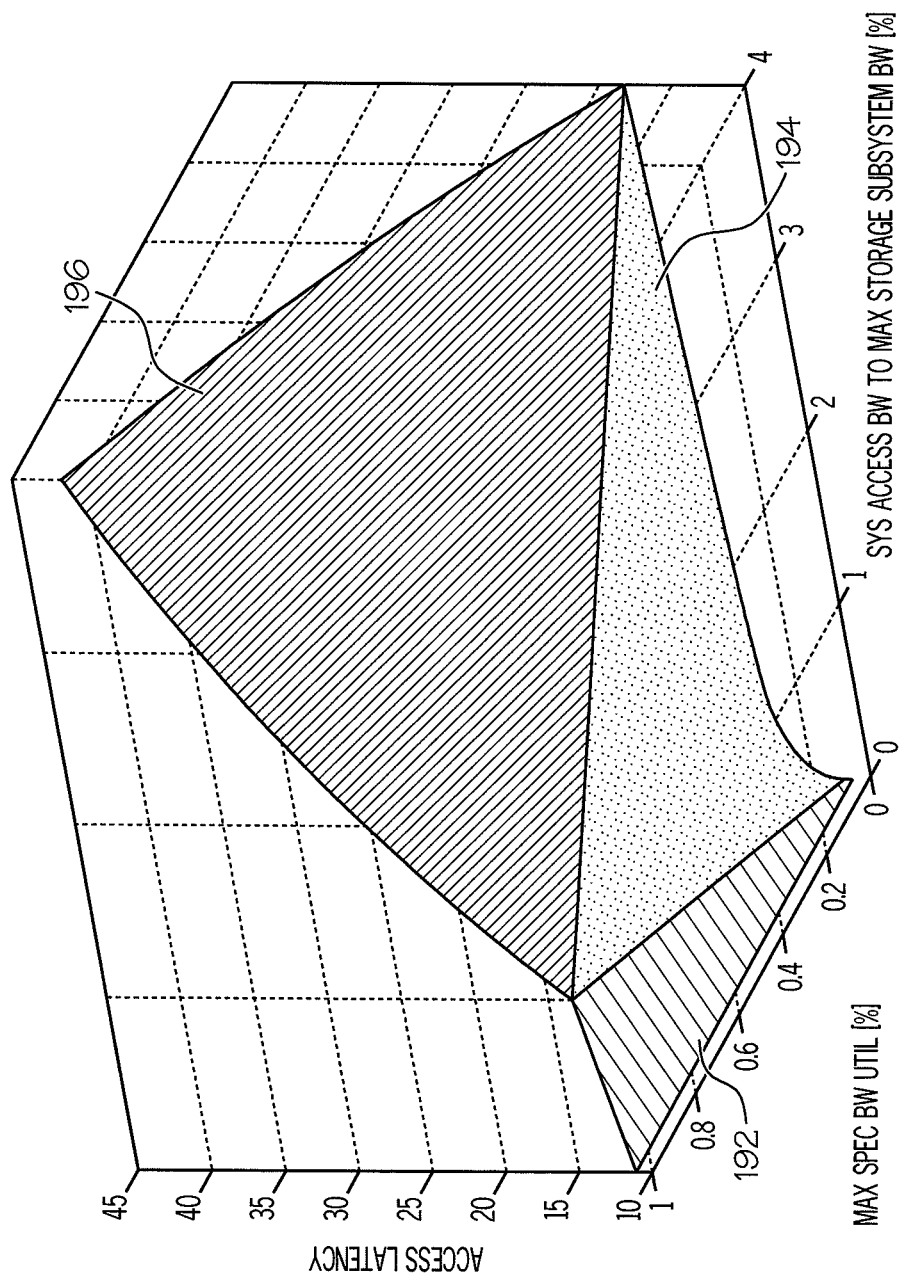
FIG. 6 is a graph showing the average access latency for a system with 25% demand accesses.
Figure 7A:
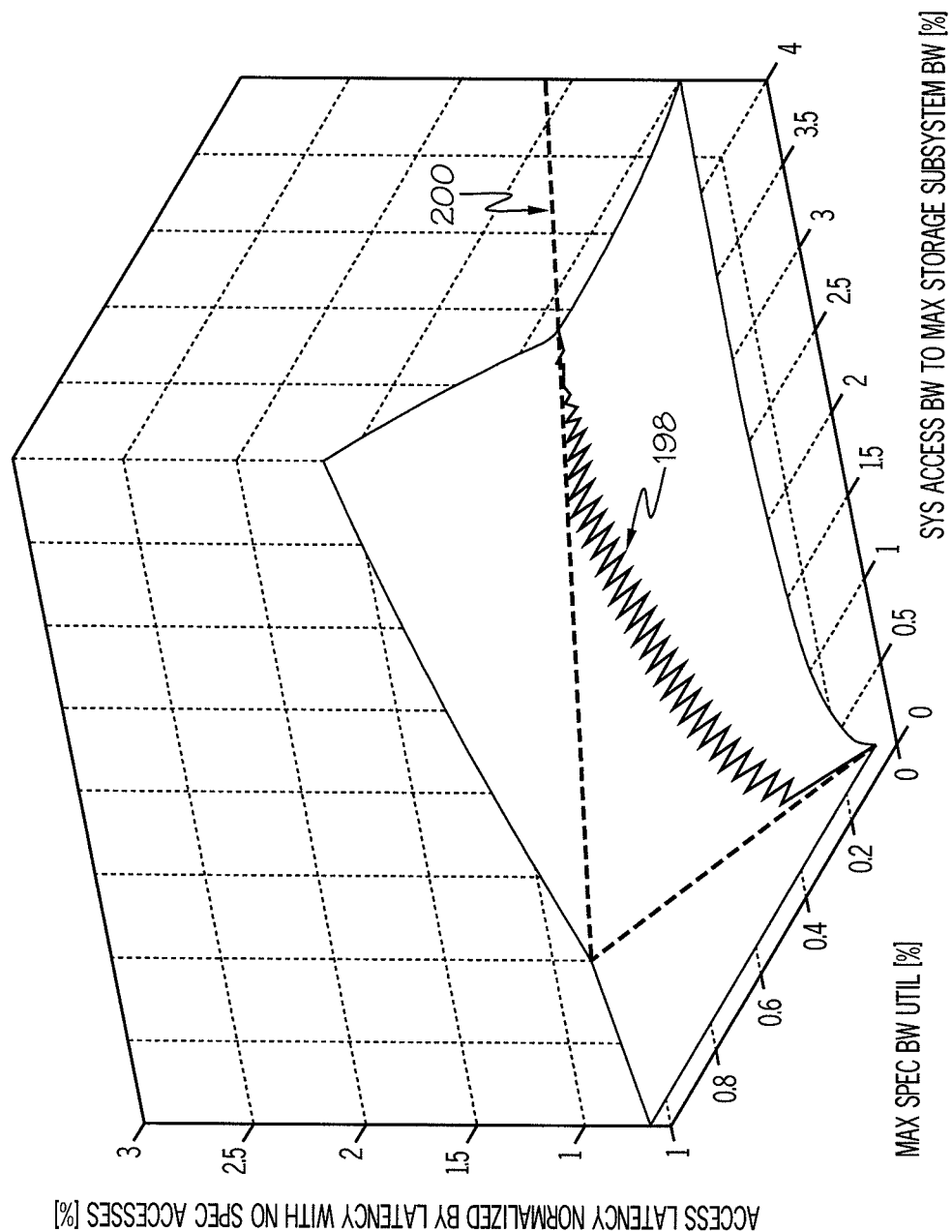
FIGS. 7a-7f are graphs showing normalized access latency for systems with 10%, 25%, 40%, 55%, 70%, and 85% demand accesses, respectively.
Figure 7B:
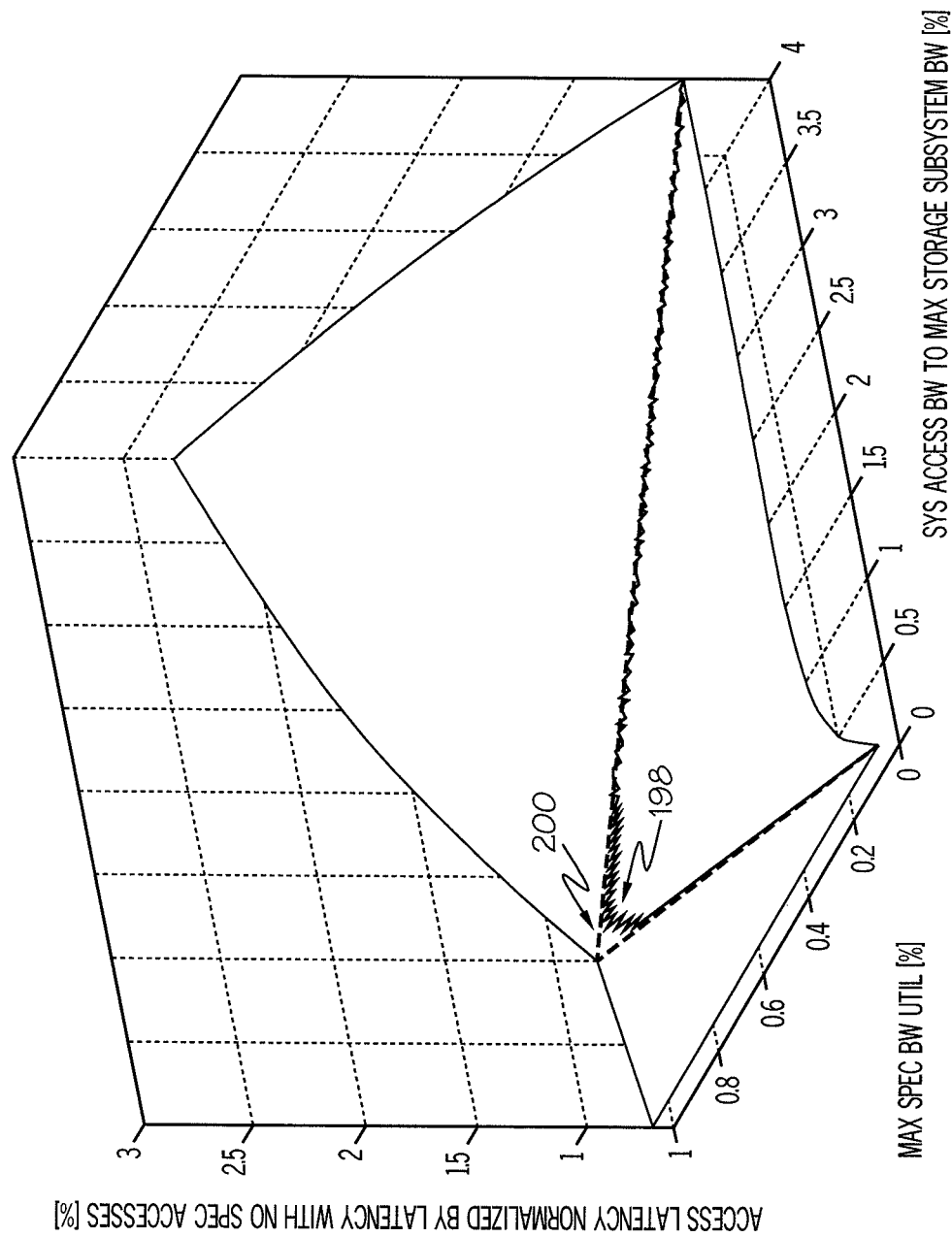
Figure 7C:
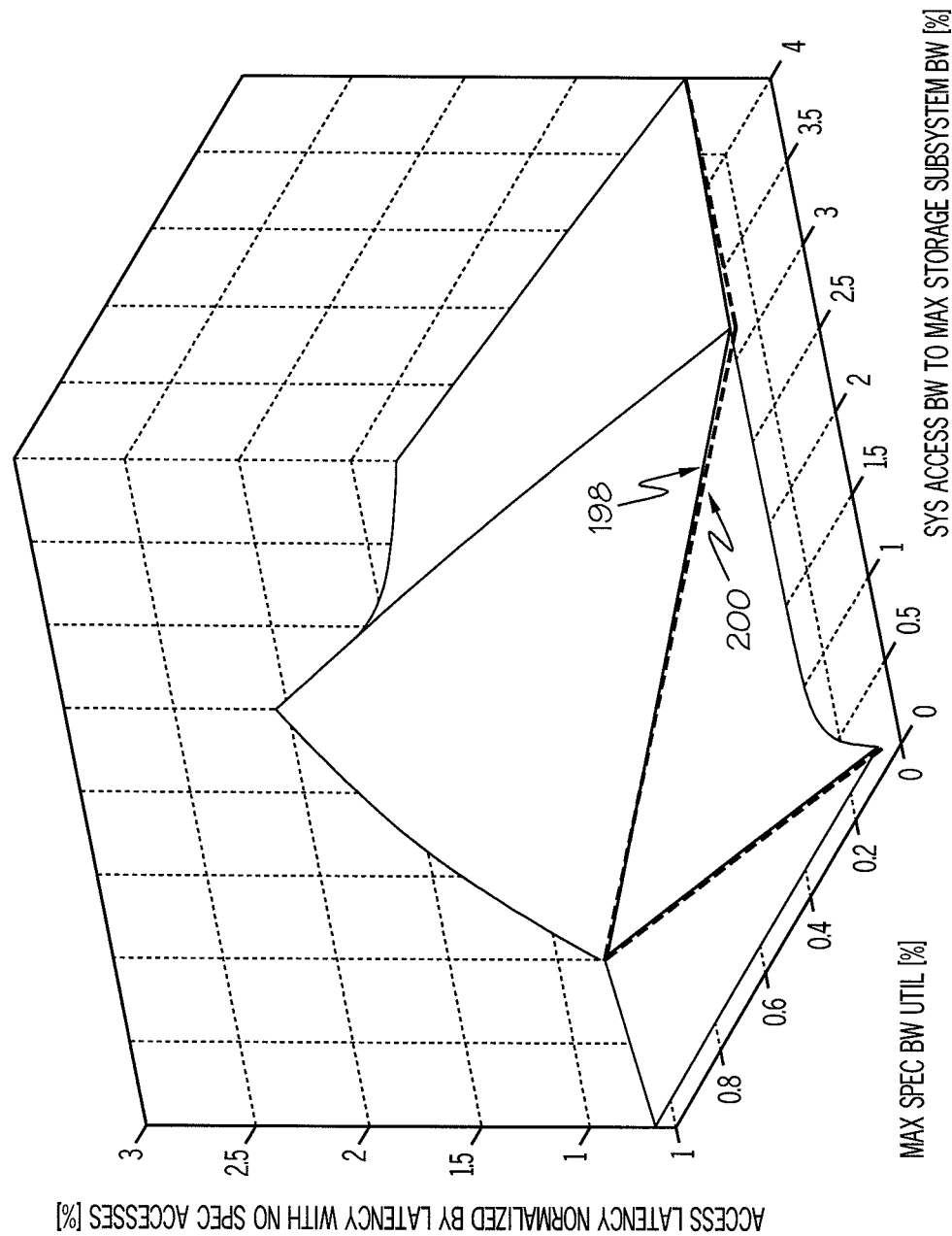
Figure 7D:
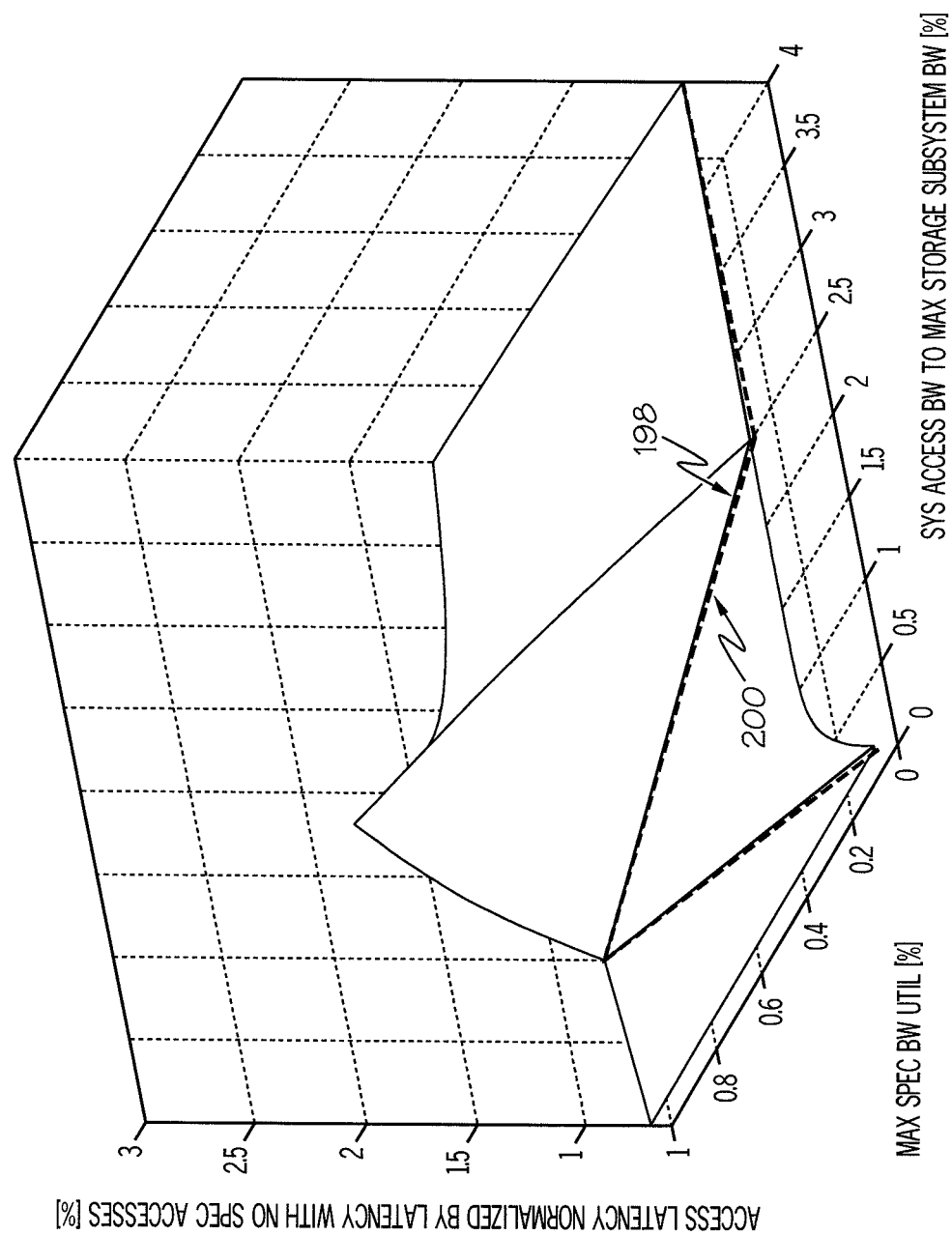
Figure 7E:
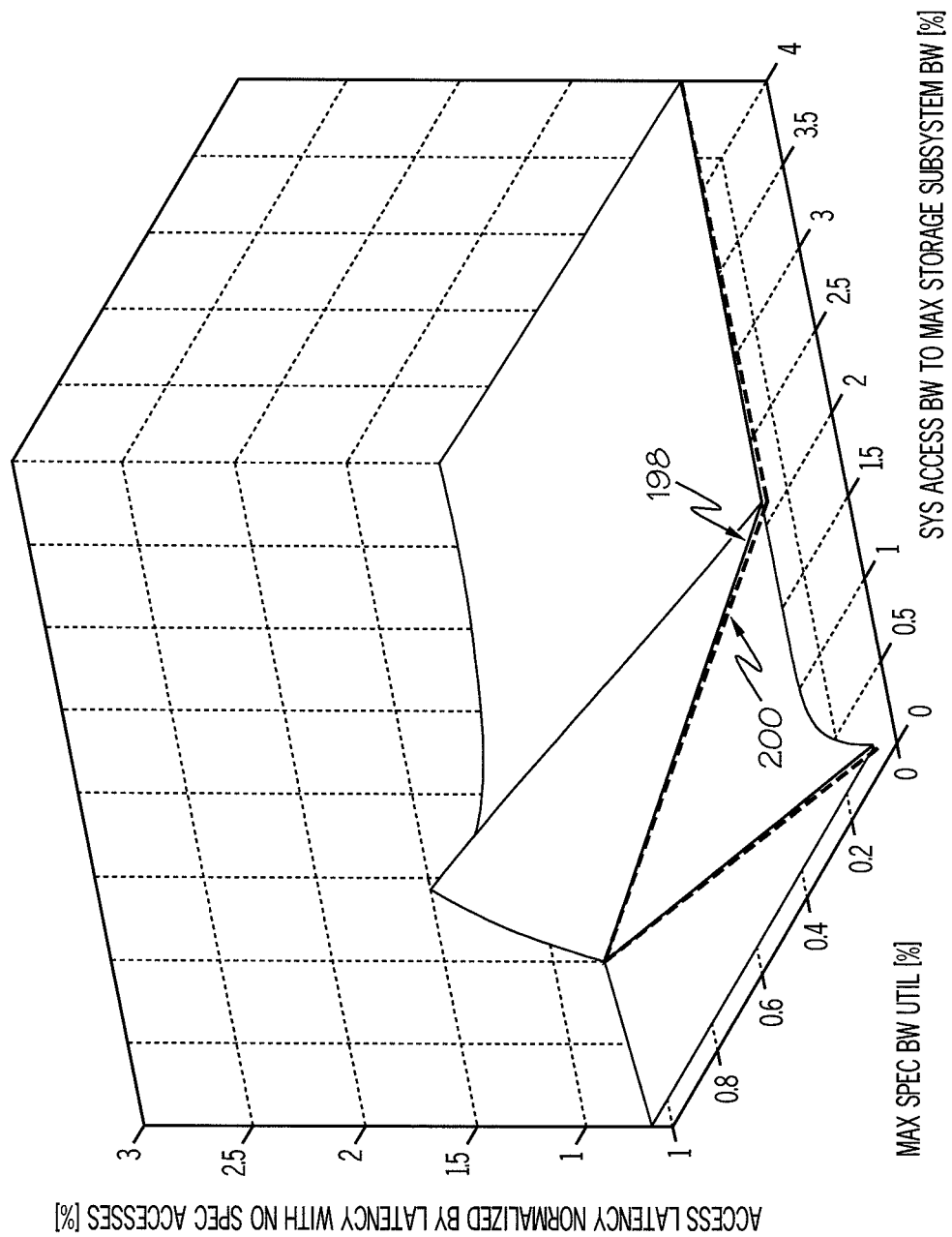
Figure 7F:
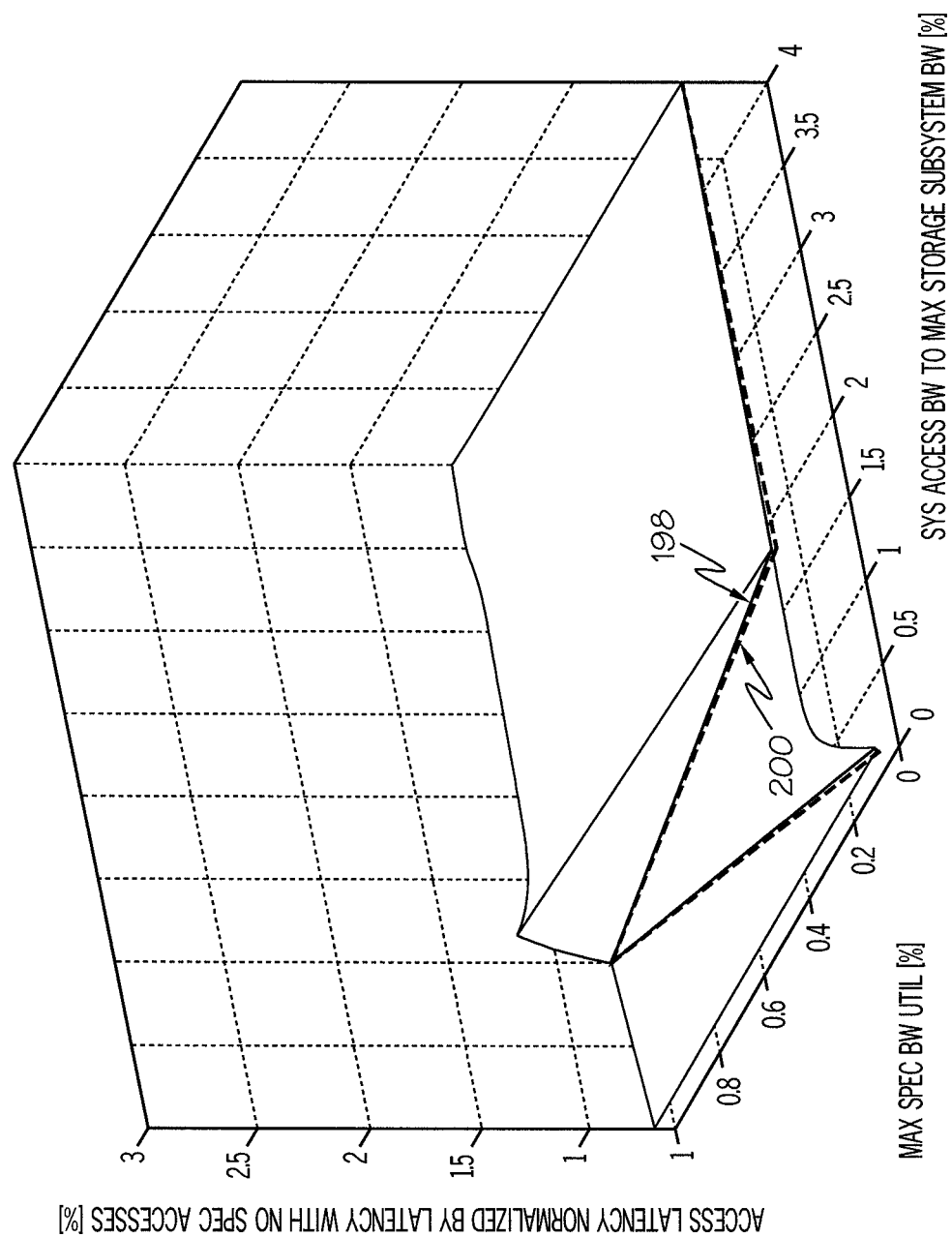

Access requests presented to the speculative dispatch logic (ACCESStotal_System) represent the total pool of accesses from which the logic must choose when making speculative dispatch decisions. Once the check for cached copies confirms which accesses need to be handled by the storage subsystem, a subset of raw system access requests becomes available (ACCESStotal_system_demand). Storage subsystem demand accesses (ACCESStotal_demand) always pull from the system demand access pool (ACCESStotal_system_demand). However, while all speculative accesses (ACCESStotal_spec) pull from the raw system accesses pool (ACCESStotal_System), speculative accesses that result in hits (ACCESStotal_spec_hit) also share membership in the system demand access set (ACCESStotal_system_demand). The relationship between these access types are shown in FIG. 6, a Venn set diagram, and in Equations 23-28, as shown below:

$$ACCESS_{total\_system} \geq ACCESS_{total\_system\_demand} \cup ACCESS_{total\_spec} \quad (23)$$

$$ACCESS_{total\_spec} = ACCESS_{total\_spec\_hit} + ACCESS_{total\_spec\_miss} \quad (24)$$

$$ACCESS_{total\_spec\_hit} = ACCESS_{total\_system\_demand} \cap ACCESS_{total\_spec} \quad (25)$$

$$ACCESS_{total\_spec\_miss} = ACCESS_{total\_spec} - ACCESS_{total\_spec\_hit} \quad (26)$$

$$ACCESS_{total\_demand} = ACCESS_{total\_system\_demand} - ACCESS_{total\_spec\_hit} \quad (27)$$

$$ACCESS_{total} = ACCESS_{total\_spec} + ACCESS_{total\_demand} \quad (28)$$

As shown in FIG. 6, set 184 correspond to ACCESStotal_System, set 186 correspond to ACCESStotal_system_demand, set 188 corresponds to ACCESS-total_spec, and set 190 corresponds to ACCESStotal_spec_hit.

A goal of a speculative access policy is to reduce the average access latency to a value less than a normal demand access, as shown below in Equation 29:

$$T_{average\_access} \leq T_{demand\_access} \quad (29)$$

Any speculative access algorithm resulting in the average access latency exceeding that of a demand access will typically adversely affect system performance. Three discrete scenarios may be considered in generating an optimal speculative access policy, as shown below in Equations 30-32:

$$1)\ BW_{system\_access} \leq BW_{max} \quad (30)$$

$$2)\ BW_{system\_access\_demand} \leq BW_{max} < BW_{system\_access} \quad (31)$$

$$3)\ BW_{max} < BW_{system\_access\_demand} \leq BW_{system\_access} \quad (32)$$

For each of the scenarios shown in Equations 30-32, a speculative access policy typically needs to consider only those accesses that occur within a fixed time interval (Taccess_max). Because an access will complete within the storage subsystem every Taccess_max cycles, regardless of whether the access is a speculative hit, miss or demand access, only those accesses that occurred during the previous window need to be examined. This window, e.g., a moving average, may be equivalent to the system access bandwidth as measured on a particular cycle (BWsystem_access[n]), as shown below in Equation 33:

$$BW_{system\_access}[n] = \quad (33)$$

$$\frac{1}{T_{read\_max}} \times \sum_{k=0}^{(T_{mc\_read\_max}-1)} ACCESS_{system}[n-k],$$

where $$ACCESS_{system}[n] = \begin{cases} 0, & \text{when no access request occurred on cycle}\#n \\ 1, & \text{access request occurred on cycle}\#n \end{cases}$$

In the event that the system's current status matches the scenario shown in Equation 30, all system accesses may be dispatched speculatively to the storage subsystem without regard for speculative hit/miss ratios. The basis for this policy may be shown in the examination of average number of cycles per access as shown below in Equations 34-35:

$$T_{average\_access} = \frac{ACCESS_{spec\_hit}}{ACCESS} \times T_{spec\_access} + \quad (34)$$

$$\frac{ACCESS_{spec\_miss}}{ACCESS} \times T_{spec\_access} + \frac{ACCESS_{demand}}{ACCESS} \times T_{demand\_access}$$

$$ACCESS = ACCESS_{spec\_hit} + ACCESS_{spec\_miss} + ACCESS_{demand} \quad (35)$$

If all accesses are dispatched speculatively, Equation 34 may be simplified as shown below in Equation 36:

$$T_{average\_access} = \quad (36)$$

$$\frac{((1 - ACCESS_{spec\_miss}) + ACCESS_{spec\_miss})}{(1 - ACCESS_{spec\_miss} + ACCESS_{spec\_miss} + 0)} \times T_{spec\_access} +$$

$$\frac{0}{(1 - ACCESS_{spec\_miss} + ACCESS_{spec\_mis} + 0)} \times$$

$$T_{demand\_access} = T_{spec\_access}$$

The result shown in Equation 36 stems from the ability of the system to effectively ignore the wasted bandwidth of the speculative misses (BWspec_access_miss). Accordingly, as long as sufficient bandwidth exists to absorb the loss from wasted speculative misses, all accesses should be dispatched speculatively to the storage subsystem. This analysis assumes that the storage subsystem is able to handle the incoming rate of accesses, as shown below in Equation 37:

$$BW_{system\_access} \leq BW_{spec\_access\_hit} + \quad (37)$$
$$BW_{spec\_access\_miss} \leq BW_{access\_max}$$

To evaluate a speculative access policy for general use, however, situations in which the system access requests exceed the storage subsystems' ability to process them should be considered. Because a storage subsystem can only process a finite number of accesses (ACCESSmax) in a given length of time (Taccess_max), any accesses that exceed the storage subsystems' maximum rate will increase the average access time. Additionally, when an access cannot be accepted due to insufficient storage device resources, the access incurs a retry penalty where the system waits for a period of time (Tretry) before retrying the failed access operation. For a system where the retry period is less than the time required to complete an access, an access may need to be retried multiple times before the storage subsystem has capacity to accept it. The number of multiple retries increases as the requested accesses increase and as the system retry period decreases. The effect of the retry penalty is shown below in Equations 38-42:

$$UTIL_{excess\_percentage} = \begin{cases} 0, & BW_{total} \leq BW_{max} \\ \frac{BW_{total} - BW_{max}}{BW_{max}}, & BW_{total} > BW_{max} \end{cases} \quad (38)$$

$$UTIL_{retry\_percentage} = T_{retry} / T_{access\_max} \quad (39)$$

$$N_{max\_retries} = \frac{UTIL_{excess\_percentage}}{UTIL_{retry\_percentage}} \quad (40)$$

$$T_{retry\_total} = \sum_{k=0}^{int(N_{max\_retries})} k \times T_{mc\_retry}, \quad (41)$$

$$k = 0, 1, 2, \ldots, int(N_{max\_retries}) +$$
$$(int(N_{max\_retries}) + 1) \times (N_{max\_retries} - int(N_{max\_retries})) \times T_{retry}$$

$$T_{retry\_avg} = T_{retry\_total} \times \frac{UTIL_{retry\_percentage}}{(BW_{total} / BW_{max})} \quad (42)$$

In addition to any retry penalty, the effect on Taccess (in Equations 14 and 15) may be represented by the ratio of requested storage subsystem bandwidth (BWtotal) to maximum storage subsystem bandwidth (BWmax), as shown below in Equations 43 and 44:

$$T_{spec\_access} = T_{address\_lookup} + T_{access}, \quad \left\{\frac{BW_{total}}{BW_{max}} \leq 100\% \right. \quad (43)$$

$$= T_{address\_lookup} + T_{access} \times \quad \left\{\frac{BW_{total}}{BW_{max}} > 100\% \right.$$

$$\frac{BW_{total}}{BW_{max}} + T_{retry\_avg},$$

$$T_{demand\_access} = T_{cache\_check} + T_{spec\_access} \quad (44)$$

By combining Equations 3, 28, 34, 43 and 44, a model may be defined to evaluate the effects of a speculative access policy on average access latency. These Equations include the following system-specific constants: Trd, Ta, Tdb, T address_lookup, Tcache_check, Taccess_max, Tretry and BWmax. In addition, the following model parameters, BWspec, BWsystem_access, and DEMAND_ACCESSpercent, may be used to define the requested storage subsystem bandwidth (BWtotal) that will effect average access latency. BWspec is the maximum bandwidth of the storage subsystem that is allowed for use on speculative accesses. Generally, BWspec must be less then or equal to BWmax. BWsystem_access is the bandwidth associated with system accesses, e.g., read requests, prior to a cache check and any resulting demand accesses. DEMAND_ACCESSpercent is the percentage of system accesses that, after undergoing a cache check, are system demand accesses that require data from the storage subsystem. The relationship between these parameters and BWtotal is shown below in Equations 45 and 46.

$$BW_{demand} = \{0, \qquad BW_{system\_access} \leq BW_{spec} \quad (45)$$

$$\left\{ \begin{array}{l} (BW_{system\_access} - BW_{spec}) \times \\ DEMAND\_ACCESS_{percent}, \end{array} \right. BW_{system\_access} > BW_{spec}$$

$$BW_{total} = \{BW_{system\_access}, \qquad BW_{system\_access} \leq BW_{spec} \quad (46)$$

$$\{BW_{spec} + BW_{demand}, \quad BW_{system\_access} > BW_{spec}$$

FIG. 6—Average Access Latency with 25% System Demand Accesses

FIG. 6 shows an example of an access latency graph. For the purposes of simplicity, units of time as used herein for the discussion of FIG. 6 are defined in terms of the access transfer time (Trd) and constants related to time will be defined as a multiple of Trd. To avoid the need to explicitly specify the maximum storage subsystem bandwidth (BWmax), all bandwidth variables as used herein will be graphed in terms of a percentage of BWmax, where (i) (BWspec)/(BWmax)≤100%; and (ii) (BWsystem_access)/(BWmax) ≤400%. FIG. 6 shows the average access latency (in Trd units) on the Z-axis, the allowed speculative bandwidth as a percentage of maximum storage subsystem bandwidth (BWspec/BWmax) on the X-axis, and the total system access bandwidth as a percentage of maximum storage subsystem bandwidth (BWsystem_access/BWmax) on the Y-axis. For the example illustrated in FIG. 6, DEMAND_ACCESSpercent=25% (fixed), Trd=1, Ta=10Trd; Tdb=10Trd; Nd=2(Tdb/Trd)=20; Tcache_miss=Trd, Tcache_check=5Trd; Taccess_max=2Ta=20Trd; and Tretry=Taccess_max=20Trd.

Referring to FIG. 6, there are three main regions of operation for the storage subsystem. Region 193 is where all accesses are dispatched speculatively. Region 194 is where some accesses are speculative but all accesses may be handled by the storage subsystem. Region 196 is where the storage subsystem is overwhelmed and retries are issued. The absolute access latency may be normalized by dividing the access latency when no speculative accesses are issued to provide a simple percentage. If the normalized access latency is less than 100%, e.g., less than one, then speculative accesses will improve performance. Conversely, if the normalized access latency is greater than 100%, speculative accesses will have a negative impact on performance.

FIGS. 7*a*-7*f*—Normalized Access Latency

FIGS. 7*a*-7*f* show normalized access latency graphs in which DEMAND_ACCESSpercentage has been varied from 10%, 25%, 40%, 55%, 70%, and 85%, respectively. In each FIG. 7*a*-7*f*, line 198 indicates the lowest possible access latency for a given (BWsystem_access/BWmax) ratio, shown on the X-axis, i.e., an ideal. Line 200 shows a linear approximation or linear curve fit of line 198 that would allow a system to improve access latency by adjusting speculative access threshold percentages.

FIG. 8—Interconnect Schematic for Algorithm to Reduce Access Latency

Adjusting the allowed percentage of speculative access requests based upon storage subsystem workload and the rate of incoming requests allows for a reduction in access latency. In one embodiment, shown in FIG. 8, a computer system may utilize an algorithm to dynamically intermix demand and speculative access requests to reduce access latency, i.e., regularly updating or computing the percentage of speculative access requests by continuously monitoring storage subsystem resources and system access rates. FIG. 8 is an interconnect schematic 212 for the speculative access threshold algorithm functions suitable for computer system 100 (shown in FIG. 1). System access monitor 202 monitors the system access request rate being presented to the storage subsystem prior to the cache check (BWsystem_access). Because the maximum access rate of the storage subsystem may be a constant (BWmax), system access monitor 202 may provide data as a percentage relative to the maximum storage subsystem access rate (BWsystem_access/BWmax). System demand access monitor 204 monitors the percentage of system access requests that pass cache checking and require data from the storage subsystem (DEMAND_ACCESSpercent). Storage subsystem speculative access monitor 206 monitors the percentage of storage subsystem resources currently being used for speculative accesses (BWspec_current/BWmax). Storage subsystem at capacity 208 monitors whether the storage subsystem can accept any more accesses (BOOLEANstorage_subsystem_at_capacity). Speculative threshold decision function 210 receives data from monitors 202, 204, 206 and 208 and outputs BOOLEANspec_dispatch.

The speculative access threshold (BWspec/BWmax) may be approximated by speculative threshold decision function 210 implementing the following equation:

$$\frac{BW_{spec}}{BW_{max}} = -1 \times \frac{BW_{system\_access}}{BW_{max}} \times \quad (47)$$

$$\frac{DEMAND\_ACCESS_{percent}}{1 - DEMAND\_ACCESS_{percent}} + \quad \left\{\frac{BW_{system\_access}}{BW_{max}} > 1 \right.$$

$$\frac{1}{1 - DEMAND\_ACCESS_{percent}},$$

$$= 1. \qquad \left\{\frac{BW_{system\_access}}{BW_{max}} \leq 1 \right.$$

The decision (BOOLEANspec_dispatch) as to whether an incoming access, e.g., pre-cache check, should be speculatively dispatched may be based on the truth table shown below in TABLE 1:

| Inputs | Output (BOOLEAN$_{spec\ dispatch}$) |
|---|---|
| $\dfrac{BW_{current\ spec}}{BW_{max}} \geq \dfrac{BW_{spec}}{BW_{max}}$ | NO, do not dispatch speculatively |
| BOOLEAN$_{full}$ = true | NO, do not dispatch speculatively otherwise, YES, dispatch speculatively |

The speculative access threshold is regularly updated/computed by monitoring storage subsystem resources and system access rates. As different programs run in a computer, the pattern of access requests will change. The speculative access threshold algorithm may allow a hardware circuit to dynamically adapt to the constantly changing pattern of access requests as the system load changes over time. The speculative access threshold may be set based on the pattern of access requests (DEMAND_ACCESSpercent), system load (BWsystem_access/BWmax), and storage subsystem load (BWspec_current/BWmax and BOOLEANstorage_subsystem_at_capacity). As a result, the disclosed system and method may remain effective as storage subsystems become more complex (e.g., multiple levels of hierarchy, multiple cores, multi-node/multi-bade systems, coherent memory space).

Because monitors 202, 204, 206 and 208 monitor various system and storage subsystem states, efficient function realization may require an examination in view of control system theory. Other embodiments may allow the output of the functions to either lead or lag the actual measured state to provide the ability to tune the total algorithm's effectiveness for a specific system and storage subsystem implementation or configuration. Some embodiments may use integer-only coding to simplify and minimize circuitry components. Conventional techniques for conversion of floating point algorithms to integer-only may be used.

Given the underlying non-linear nature of the "ideal" access threshold algorithm, the error term associated with linear-curve fit equation shown in Equation 47 may grow as the READ_DEMANDpercent approaches either 0% or 100%. For example, as shown in FIGS. 7a-7f, the embodiment of the access threshold algorithm shown in Equation 47 has the greatest accuracy, i.e., compared to the ideal 198, over a READ_DEMANDpercent range of 25%-85%. To minimize the error term, various standard techniques may be used to generate a more discrete curve fit equation, such as additional linear segments, and table lookups, among other techniques.

FIG. 9—Computer Network

FIG. 9 shows an embodiment of a computer network system, shown by 214. Computer network system 214 comprises network 216, such as a WAN or LAN. Client or user 218 is connected to network 216. Web server 220 manages access over network 216 to allow client 218 to access web page 222. Web server 220 uses an embodiment of the speculative access threshold algorithm to manage access over network 216. Web page 222 contains a link to data file 224 stored on database 226. Before client 218 may access web page 222, web server 220 may need to construct web page 222 by accessing data from database 226. For example, web server 220 may need to render data file 224, e.g., where data file 224 is a map or image, depending on whether a user wishes to access data file 224. Web server 220 uses the speculative threshold algorithm to decide whether to "speculatively" pre-render data file 224, e.g., access data file 224 from database 226, before the user 218 actually clicks the link to view it, or wait to do so until the user 218 actually clicks the link, e.g., similar to a demand read.

Instead of storage subsystem resources, the limited bandwidth being monitored for computer network 214 is the available CPU resources of web server 220. If the system load is low, then extra CPU resources may be used to speculatively pre-render data file 224 so that the latency experienced by user 218 is reduced. As system load increases, the speculative threshold algorithm ensures that less of the CPU resources are dedicated to speculative pre-rendering and instead, web server 220 waits on "demand" render requests of data file 224. Similarly, web server 220 may monitor bandwidth for database 226. Speculative fetching of data from database 226, e.g., for pre-rendering data file 224, may be restricted based on current database bandwidth utilization. Web server 220 may also monitor bandwidth for network 216. For example, web server 220 may chose to speculatively load data related to the web page 222. If the network bandwidth is already busy with actual or "demand" requests, then web server 220 can limit the amount of data it uploads to client 218.

From the foregoing detailed description of specific embodiments of the invention, it should be apparent that a system and method handling data access based on available system resources has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A method for handling speculative access requests for a storage device in a computer system comprising the steps of:
   providing a speculative access threshold corresponding to a selected percentage of a total number of accesses to be speculatively issued, wherein said speculative access threshold is determined by an equation using one or more of the following: a system access request rate and a percentage of access requests that do not have valid cached data available and require data from the storage device; and
   intermixing demand accesses and speculative accesses in accordance with the speculative access threshold.

2. The method of claim 1, further comprising the steps of:
   dispatching an incoming access request speculatively if current storage device bandwidth being used for speculative accesses is less than the speculative access threshold; and
   preventing the incoming access request from dispatching as a speculative access request if current storage device resources being used for speculative accesses is equal to or greater than the speculative access threshold.

3. The method of claim 2, further comprising the step of preventing the incoming access from dispatching as a speculative access if the storage device can not accept any more access requests.

4. The method of claim 3, wherein the speculative access threshold is based on said system access request rate.

5. The method of claim 4, wherein the speculative access threshold is further based on said percentage of access requests that do not have valid cached data available and require data from the storage device.

6. A computer system comprising
a CPU;
a storage device;
circuitry for providing a speculative access threshold corresponding to a selected percentage of a total number of accesses to the storage device that can be speculatively issued, wherein said speculative access threshold is determined by an equation using one or more of the following: a system access request rate and a percentage of access requests that do not have valid cached data available and require data from the storage device; and
circuitry for intermixing demand accesses and speculative accesses in accordance with the speculative access threshold.

7. The computer system of claim 6, further comprising:
circuitry for dispatching an incoming access request speculatively if current storage device bandwidth being used for speculative accesses is less than the speculative access threshold; and
circuitry for preventing the incoming access request from dispatching as a speculative access request if current storage device resources being used for speculative accesses is equal to or greater than the speculative access threshold.

8. The computer system of claim 7, further comprising circuitry for preventing the incoming access from dispatching as a speculative access if the storage device can not accept any more access requests.

9. The computer system of claim 8, wherein the speculative access threshold is based on said system access request rate.

10. The computer system of claim 9, wherein the speculative access threshold is further based on said percentage of access requests that do not have valid cached data available and require data from the storage device.

11. A computer program product embodied in a computer readable storage medium for handling speculative access requests for a storage device in a computer system comprising the programming steps of:
providing a speculative access threshold corresponding to a selected percentage of a total number of accesses to the storage device that can be speculatively issued, wherein said speculative access threshold is determined by an equation using one or more of the following: a system access request rate and a percentage of access requests that do not have valid cached data available and require data from the storage device; and
intermixing demand accesses and speculative accesses in accordance with the speculative access threshold.

12. The computer program product of claim 11, further comprising the programming steps of:
dispatching an incoming access request speculatively if current storage device bandwidth being used for speculative accesses is less than the speculative access threshold; and
preventing the incoming access request from issuing as a speculative access request if current storage device resources being used for speculative accesses is equal to or greater than the speculative access threshold.

13. The computer program product of claim 12, further comprising the programming step of preventing the incoming access request from issuing as a speculative access request if the storage device can not accept any more access requests.

14. The computer program product of claim 13, wherein the speculative access threshold is based on said system access request rate.

15. The computer program product of claim 13, wherein the speculative access threshold is further based on said percentage of access requests that do not have valid cached data available and require data from the storage device.

* * * * *